US012812438B2

(12) United States Patent
Yao et al.

(10) Patent No.: US 12,812,438 B2
(45) Date of Patent: Nov. 24, 2026

(54) SENSING MEASUREMENT BY A TERMINAL IN AN IDLE/ACTIVE STATE

(71) Applicant: VIVO MOBILE COMMUNICATION CO., LTD., Guangdong (CN)

(72) Inventors: Jian Yao, Guangdong (CN); Xiang Pan, Guangdong (CN); Hongping Zhang, Guangdong (CN); Dajie Jiang, Guangdong (CN); Yannan Yuan, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 311 days.

(21) Appl. No.: 18/650,791

(22) Filed: Apr. 30, 2024

(65) Prior Publication Data

US 2024/0292261 A1 Aug. 29, 2024

Related U.S. Application Data

(63) Continuation of application No. PCT/CN2022/128017, filed on Oct. 27, 2022.

(30) Foreign Application Priority Data

Nov. 1, 2021 (CN) ......................... 202111284714.6

(51) Int. Cl.
*H04W 24/10* (2009.01)
*H04W 4/38* (2018.01)

(52) U.S. Cl.
CPC ............. *H04W 24/10* (2013.01); *H04W 4/38* (2018.02)

(58) Field of Classification Search
CPC ....... H04W 24/00; H04W 24/10; H04W 4/00; H04W 4/30; H04W 4/38; H04W 84/18; H04L 43/00; H04L 43/06–08; H04L 67/025
See application file for complete search history.

(56) References Cited

U.S. PATENT DOCUMENTS

2009/0227251 A1* 9/2009 Lei ......................... H04W 24/08 455/425
2014/0362720 A1* 12/2014 Kim ......................... H04B 7/024 370/252
2015/0208226 A1* 7/2015 Kuusilinna ........... H04W 4/029 455/414.3

(Continued)

FOREIGN PATENT DOCUMENTS

CN 102271021 A 12/2011
CN 109451430 A 3/2019
WO 2021207317 A1 10/2021

OTHER PUBLICATIONS

Written Opinion of the ISA dated Jan. 20, 2023 in International Application No. PCT/CN2022/128017. English translation attached.

(Continued)

*Primary Examiner* — Warner Wong

(57) ABSTRACT

This application belongs to the field of communication technologies, and discloses a sensing method, a sensing apparatus, and a communication device. The method in an embodiment of this application includes: performing, by a first terminal, sensing measurement to obtain a sensing measurement result, where the first terminal is a terminal in an idle state or an inactive state; and reporting, by the first terminal, the sensing measurement result.

18 Claims, 4 Drawing Sheets

(56) References Cited

U.S. PATENT DOCUMENTS

| | | | | |
|---|---|---|---|---|
| 2016/0270036 | A1* | 9/2016 | Fröberg Olsson | H04L 5/0051 |
| 2020/0229130 | A1 | 7/2020 | Keating et al. | |
| 2021/0058839 | A1* | 2/2021 | Yang | H04W 76/27 |
| 2021/0067999 | A1 | 3/2021 | Yang | |
| 2021/0227586 | A1* | 7/2021 | Huang | H04W 74/0833 |
| 2022/0046749 | A1* | 2/2022 | Lin | H04W 76/27 |
| 2022/0217560 | A1* | 7/2022 | Kumar | H04W 24/08 |
| 2023/0088189 | A1* | 3/2023 | Tseng | H04W 52/0225 370/252 |
| 2023/0316256 | A1* | 10/2023 | Agrawal | H04W 76/11 705/41 |
| 2023/0328835 | A1* | 10/2023 | Wu | H04W 76/27 370/329 |
| 2023/0379860 | A1* | 11/2023 | Rao | G01S 5/01 |
| 2024/0072973 | A1* | 2/2024 | Niu | H04L 5/0053 |
| 2024/0179757 | A1* | 5/2024 | Wen | H04W 76/19 |
| 2024/0365150 | A1* | 10/2024 | Babaei | H04W 74/0836 |

OTHER PUBLICATIONS

First Office Action dated Jun. 22, 2025 received in corresponding patent family application No. CN202111284714.6. English translation attached.

Extended European Search Report dated Dec. 16, 2024 received in corresponding European Application No. EP22886085.4.

International Search Report dated Jan. 20, 2023 in International Application No. PCT/CN2022/128017. English translation attached.

Second Office Action dated Nov. 1, 2025 received in corresponding patent family application No. CN202111284714.6. English translation attached.

First Office Action dated Feb. 6, 2026 received in corresponding patent family application No. EP22886085.4.

* cited by examiner

SENSING MEASUREMENT BY A TERMINAL IN AN IDLE/ACTIVE STATE

CROSS-REFERENCE TO RELATED APPLICATIONS

This application is a Bypass Continuation Application of PCT International Application No. PCT/CN2022/128017 filed on Oct. 27, 2022, which claims priority to Chinese Patent Application No. 202111284714.6, filed on Nov. 1, 2021 in China, which are incorporated herein by reference in their entireties.

TECHNICAL FIELD

The present invention relates to the field of communication technologies, and in particular, to a sensing method, a sensing apparatus, and a communication device.

BACKGROUND

A future mobile communication system not only has a communication capability, but also has a sensing capability. For the sensing capability, one or more devices with the sensing capability can sense information such as an orientation, a distance, or a speed of a target object through sending and receiving of radio signals, or detect, track, identify, image, or the like a target object, an event, an environment, or the like. Currently, a specific sensing procedure of a terminal in an idle state or an inactive state is not clear yet.

SUMMARY

According to a first aspect, a sensing method is provided, including:

- performing, by a first terminal, sensing measurement to obtain a sensing measurement result, where the first terminal is a terminal in an idle state or an inactive state; and
- reporting, by the first terminal, the sensing measurement result.

According to a second aspect, a sensing method is provided, including:

- obtaining, by a network device, a sensing measurement result reported by a first terminal, where the first terminal is a terminal in an idle state or an inactive state.

According to a third aspect, a sensing apparatus is provided, including:

- a first measurement module, configured to perform sensing measurement based on a first terminal, to obtain a sensing measurement result, where the first terminal is a terminal in an idle state or an inactive state; and
- a first reporting module, configured to report the sensing measurement result.

According to a fourth aspect, a sensing apparatus is provided, including:

- an obtaining module, configured to obtain a sensing measurement result reported by a first terminal, where the first terminal is a terminal in an idle state or an inactive state.

According to a fifth aspect, a communication device is provided. The communication device includes a processor, a memory, and a program or an instruction stored in the memory and capable of running on the processor, where when the program or the instruction is executed by the processor, the steps of the method according to the first aspect or the second aspect are implemented.

According to a sixth aspect, a communication device is provided, including a processor and a communication interface, where the processor is configured to perform sensing measurement when a first terminal is in an idle state or an inactive state, to obtain a sensing measurement result; and the communication interface is configured to report the sensing measurement result. Alternatively, the communication interface is configured to obtain a sensing measurement result reported by a first terminal, where the first terminal is a terminal in an idle state or an inactive state.

According to a seventh aspect, a readable storage medium is provided, where the readable storage medium stores a program or an instruction, and when the program or the instruction is executed by a processor, the steps of the method according to the first aspect or the second aspect are implemented.

According to an eighth aspect, a chip is provided. The chip includes a processor and a communication interface, the communication interface is coupled to the processor, and the processor is configured to run a program or an instruction, to implement the method according to the first aspect or the second aspect.

According to a ninth aspect, a computer program/program product is provided, where the computer program/program product is stored in a non-transient storage medium, and the computer program/program product is executed by at least one processor to implement the steps of the method according to the first aspect or the second aspect.

DESCRIPTION OF EMBODIMENTS

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms “first”, “second”, and the like in this specification and claims of this application are used to distinguish between similar objects instead of describing a specific order or sequence. It should be understood that, the terms used in such a way are interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

It should be noted that, the technologies described in the embodiments of this application are not limited to a long term evolution (LTE)/LTE-advanced (LTE-A) system, and can also be used in other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a new radio (NR) system for example purposes, and NR terms are used in most of the following descriptions, and these technologies can also be applied to an application other than an NR system application, for example, a $6^{th}$ generation (6G) communication system.

Figure 1:
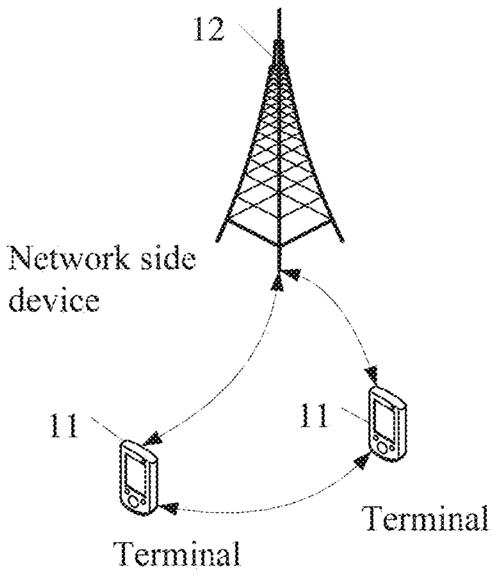
FIG. 1 is a structural diagram of a communication system to which embodiments of this application can be applied.

FIG. 1 is a structural diagram of a wireless communication system to which embodiments of this application can be applied. The wireless communication system includes a terminal 11 and a network side device 12. The terminal 11 may also be referred to as a terminal device or a user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), an augmented reality (AR)/virtual reality (VR) device, a robot, a wearable device, vehicle user equipment (VUE), pedestrian user equipment (PUE), smart household (household devices with wireless communication functions, such as a refrigerator, a television, a washing machine, or furniture), and the wearable device includes a smart watch, a smart band, smart earphones, smart glasses, smart jewelry (a smart bracelet, a smart hand chain, a smart ring, a smart necklace, a smart bangle, a smart anklet, or the like), a smart wristband, smart clothes, a game console, and the like. It should be noted that a specific type of the terminal 11 is not limited in the embodiments of this application. The network side device 12 may be a base station or a core network device. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or some other appropriate term in the art. As long as the same technical effect is achieved, the base station is not limited to a specific technical term.

To enable a person skilled in the art to better understand the embodiments of this application, the following descriptions are first provided.

Integration of communication and sensing means implementing an integrated design of communication and sensing functions in a same system through spectrum sharing and hardware sharing. While transferring information, the system can sense information such as an orientation, a distance, or a speed, and detect, track, and identify a target device or an event. A communication system and a sensing system complement each other to improve overall performance and bring better service experience.

A future mobile communication system, such as a B5G system or a 6G system only has a communication capability, but also has a sensing capability. For the sensing capability, one or more devices with the sensing capability can sense information such as an orientation, a distance, or a speed of a target object through sending and receiving of a radio signal, or detect, track, identify, image, or the like a target object, an event, an environment, or the like. In the future, with deployment of small cells with a high band and a large bandwidth capability such as a millimeter-wave small cell and a terahertz small cell in a 6G network, sensing resolution is significantly increased compared with a centimeter wave, so that the 6G network can provide a more detailed sensing service.

Integration of communication and a radar is a typical fusion application of communication and sensing. In the past, due to different research objects and focuses, a radar system and a communication system were strictly distinguished between. In most scenarios, the two systems were separately studied. In fact, as typical manners of sending, obtaining, processing, and exchanging information, both the radar system and the communication system have many similarities in working principles, system architectures, and frequency bands. A design of the integration of communication and the radar is relatively highly feasible and is mainly reflected in the following aspects: First, both the communication system and the sensing system complete information obtaining and transferring based on an electromagnetic wave theory through transmission and reception of an electromagnetic wave. Second, both the communication system and the sensing system have structures, such as an antenna, a transmit send, a receive end, and a signal processor, and there is a large overlap in hardware resources. With development of technologies, the communication system and the sensing system have more overlaps in working frequency bands. In addition, there are similarities in key technologies such as signal modulation, reception detection, and waveform designs. The integration of the communication system and the radar system can bring many advantages, such as cost savings, size reduction, power consumption reduction, an increase in spectrum efficiency, and reduction of mutual interference, thereby enhancing overall system performance.

Currently, there have been many related studies on the integrated design of the radar system and the communication system. A typical joint design includes: spectrum coexistence, where the two systems work independently, and an information exchange is allowed to reduce mutual interference; receive end sharing, where transmit ends of the two systems send their own signal waveforms in this case, and the waveforms of the two systems need to be orthogonal, so that their respective reception and detection are not affected; transmit end sharing, where the transmit end transmits a joint waveform of a radar and communication; and transceiver end sharing, where a resource is shared on two sides, that is, a receiving side and a sending side, of the two systems, and joint waveforms or waveforms with an orthogonal relationship also need to be used.

Sensing may be based on a single-station mode, that is, a transmit-receive co-location mode. A transmit end transmits a sensing signal, receives and analyzes an echo signal, and extracts a sensing parameter. For example, a base station acts as both a transmit end and a receive end of the sensing signal, and a terminal or another object acts as a sensing target. Alternatively, sensing may be based on a dual-station/multi-station mode, that is, a transmit-receive non-co-location mode. A transmit end transmits a sensing signal, and another receive end receives and analyzes the sensing signal to extract a sensing parameter. For example, a base station 1 acts as a transmit end of the sensing signal, and a terminal or a base station 2 acts as a receive end of the sensing signal. Similarly, a transmit end for sensing in a single-station or multi-station mode may also be a terminal.

With reference to the accompanying drawings, a sensing method provided in an embodiment of this application is described below in detail by using some embodiments and application scenarios thereof.

Figure 2:
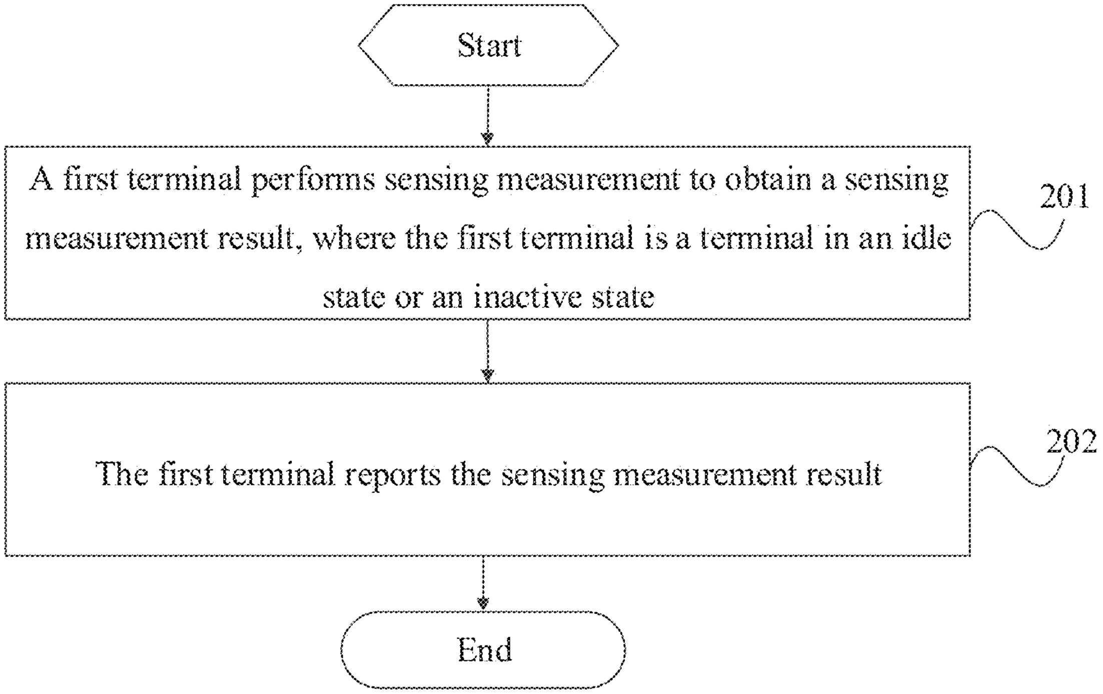
FIG. 2 is a schematic flowchart 1 of a sensing method according to an embodiment of this application.

As shown in FIG. 2, an embodiment of this application provides a sensing method, including the following steps.

Step 201: A first terminal performs sensing measurement to obtain a sensing measurement result, where the first terminal is a terminal in an idle state or an inactive state.

Herein, the first terminal can perform sensing measurement on a received sensing signal, to obtain the sensing measurement result.

The sensing signal in this embodiment of this application can be specifically a signal used to obtain information such as an orientation, a distance, or a speed of a target object, or a signal used to detect, track, identify, and image a target object, an event, an environment, or the like.

The sensing signal includes at least one of the following:

- a demodulation reference signal (DMRS) for paging a PDCCH, a DMRS for paging a PDSCH, and a first reference signal; or a data symbol on a data channel PDSCH.

The first reference signal may include a CSI reference signal (CSI-RS), a phase tracking reference signal (PTRS), a positioning reference signal (PRS), a tracking reference signal (TRS), a DMRS on a physical broadcast channel (PBCH), a primary synchronisation signal (PSS), a secondary synchronisation signal (SSS), and the like.

Step 202: The first terminal reports the sensing measurement result.

In the sensing method in this embodiment of this application, the first terminal in the idle state or the inactive state performs sensing measurement, to obtain the sensing measurement result, and reports the sensing measurement result, thereby implementing an objective of performing sensing by the terminal in the idle state or the inactive state.

Optionally, that a first terminal performs sensing measurement to obtain a sensing measurement result includes:

- receiving, by the first terminal, first indication information, where the first indication information includes at least one of configuration information of a sensing signal or a sensing measurement quantity;
- receiving, by the first terminal, the sensing signal based on the configuration information of the sensing signal; and
- performing, by the first terminal, sensing measurement on the sensing signal based on the sensing measurement quantity, to obtain the sensing measurement result.

Optionally, the configuration information of the sensing signal includes at least one of the following:

- a waveform of the sensing signal, such as OFDM, single-carrier frequency division multiple access (C-FDMA), orthogonal time frequency space (OTFS), a frequency modulated continuous wave (FMCW), or a pulse signal;
- a subcarrier spacing of the sensing signal, for example, a subcarrier spacing 30 KHz of an OFDM system;
- a guard interval of the sensing signal, that is, a time gap between a moment at which sending a signal is ended and a moment at which a latest echo signal of the signal is received, where the parameter is proportional to a maximum sensing distance and may be obtained by means of calculation by using 2 dmax/c, where dmax is a maximum sensing distance, for example, for a self-transmitting and self-receiving sensing signal, dmax represents a maximum distance from a transceiving point of the sensing signal to a reflection point of the signal; and in some cases, a cyclic prefix CP of an OFDM signal may serve as a minimum guard interval; and c is a speed of light;
- a bandwidth of the sensing signal, where the parameter is inversely proportional to distance resolution and may be obtained by using c/(2×delta_d), where delta_d is the distance resolution (which belongs to a sensing requirement);
- burst duration of the sensing signal, where the parameter is inversely proportional to rate resolution (which belongs to a sensing requirement), and the parameter is a time span of the sensing signal and is mainly used to calculate a Doppler frequency shift; and the parameter may be calculated by using c/(2×delta_v×fc), where delta_v is speed resolution, and fc is a center frequency of the signal;
- a time domain interval of the sensing signal, where the parameter may be obtained by means of calculation by using c/(2×fc×v_range), where v_range is a maximum rate minus a minimum speed (which belongs to a sensing requirement), the parameter is a time gap between two adjacent sensing signals, and fc is a carrier frequency of the signal; a transmit signal power of the sensing signal, for example, a value is taken every 2 dBm from −20 dBm to 23 dBm;
- a signal format of the sensing signal, for example, information such as a sounding reference signal (SRS), a DMRS, a PRS, or another predefined signal, and a related sequence format;
- a signal direction of the sensing signal, for example, a direction of the sensing signal or beam information;
- a time resource of the sensing signal, for example, a slot index or a symbol index of a slot in which the sensing signal is located, where there are two types of time resources: a one-off time resource, for example, an omnidirectional first signal is sent on one symbol; and a non-one-off time resource, for example, in a plurality of groups of periodic time resources or discontinuous time resources (which may include a start time and an end time), target signals in a same direction are sent on each group of periodic time resources, and beam directions of periodic time resources in different groups are different;
- a frequency resource of the sensing signal, including a center frequency, a bandwidth, an RB, and/or a subcarrier of the target signal;
- a quasi-co-location QCL relationship of the sensing signal, for example, the target signal includes a plurality of resources and each resource is QCLed with SSB, where the QCL includes a type A, B, C, or D; or
- antenna information of the sensing signal, where the antenna information is a signal sending antenna and/or a signal receiving antenna.

Optionally, the sensing measurement quantity includes at least one of the following:

- original channel information;
- signal strength information;

spectrum information;

multipath information;

angle information;

difference information of signals corresponding to different antennas; or target parameter information determined based on the original channel information.

The original channel information includes at least one of the following:

a channel matrix H; or channel state information (CSI), such as an amplitude/a square of an amplitude and/or a phase of a frequency domain channel response, or a feature of an I signal and a feature of a Q signal of a frequency domain channel response, such as an amplitude/a square of an amplitude of the I and Q signals.

The signal strength information includes at least one of the following:

a reference signal received power (RSRP); or a reference signal received information (RSRI).

The spectrum information includes at least one of the following:

a channel power delay profile (PDP);

a Doppler power spectrum; or a power azimuth spectrum (PAS).

The multipath information includes at least one of the following:

a power of each path (including at least a first-arrival path, an LOS path, a first-order reflection path, and a multi-order reflection path) on a multipath channel;

a delay of each path on a multipath channel; or an angle of each path on a multipath channel.

The difference information of signals corresponding to different antennas includes at least one of the following:

a quotient or conjugate product of frequency domain channel responses of a first antenna and a second antenna;

an amplitude ratio or an amplitude difference between signals received by a first antenna and a second antenna;

a phase difference between signals of a first antenna and a second antenna; or a delay difference between signals of a first antenna and a second antenna.

The target parameter information determined based on the original channel information includes at least one of the following:

a Doppler spread;

a Doppler frequency shift;

a maximum delay spread;

an angle spread;

a coherent bandwidth; or a coherent time.

The angle information includes at least one of the following:

an angle of arrival; or an angle of departure.

The angle information includes UE side angle information, base station side angle information, and reflection point angle information.

Optionally, that a first terminal performs sensing measurement includes: receiving, by the first terminal, second indication information, where the second indication information includes a terminal identifier list, and a terminal corresponding to the terminal identifier list is a terminal with a sensing capability; and when the terminal identifier list includes a terminal identifier of the first terminal, performing, by the first terminal, sensing measurement.

In this embodiment of this application, the terminal identifier may be an identifier of a terminal group, the terminal identifier list may be determined by a network function or a network element (such as a sensing network function or a sensing network element) of a core network. The first terminal performs matching between an ID of the first terminal and an ID in the terminal identifier list; and if the ID of the first terminal is the ID in the list, determines that the first terminal is a terminal associated with sensing, to perform sensing measurement.

The foregoing terminal identifier may be a terminal core network identifier, such as a 5G globally unique temporary UE identity (5G-GUTI), a 5G-S-shortened form-temporary mobile subscriber identity (5G-S-TMSI), a 5G-TMSI, or a subscription concealed identifier (SUCI), or may be a UE wireless access network identifier, such as an inactive RNTI (I-RNTI) or a RAN UE NG application protocol (NGAP) ID.

Optionally, the terminal corresponding to the terminal identifier list is a terminal with a first sensing capability type, and the first sensing capability type is a sensing capability type corresponding to the sensing measurement.

That is, the foregoing first sensing capability type is a sensing capability type corresponding to a current sensing service, for example, an echo detection capability type.

Optionally, that the first terminal reports the sensing measurement result includes:

receiving, by the first terminal, third indication information, where the third indication information includes at least one of a reporting manner for the sensing measurement result, a reporting time of the sensing measurement result, and a quantity of times the sensing measurement result is reported; and reporting, by the first terminal, the sensing measurement result based on the third indication information.

The foregoing reporting time of the sensing measurement result may be a time point, a reporting cycle, and/or a latest reporting time (associated with sensing quality of service (QoS)).

The foregoing sensing measurement result reporting cycle may be the same as a DRX cycle, that is, a downlink sensing signal is delivered through paging, and is measured and reported after a paging signal is received each time.

Optionally, the method in this embodiment of this application further includes:

reporting a data volume of the sensing measurement result, where the reporting manner for the sensing measurement result is related to the data volume of the sensing measurement result.

A specific manner of reporting the data volume may include at least one of the following:

initiating, by the UE, SDT, and performing reporting by using an MSG 1 (represented by using a special preamble or by using a special RO resource);

initiating, by the UE, SDT, and performing reporting by using an MSG 3;

initiating, by the UE, SDT; and after an RRC resume request is sent by using an MSG 3, enabling a time window, where within the time window, the UE may receive a PUSCH scheduled by using a PDCCH and perform reporting through the PUSCH; or initiating, by the UE, random access to enter a connected state, and performing reporting through a PUCCH or a PUSCH.

Herein, the data volume of the sensing measurement result is reported to a network device, so that the network device determines a corresponding reporting manner for the sensing measurement result based on the data volume.

Specifically, when the data volume of the sensing measurement result is less than or equal to a first preset threshold, the reporting manner for the sensing measurement result is a first reporting manner; or when the data volume of the sensing measurement result is greater than a first preset threshold, the reporting manner for the sensing measurement result is a second reporting manner, where the first reporting manner is a manner of performing reporting by initiating small data transmission (SDT); and the second reporting manner is a manner of performing reporting by initiating random access.

In this embodiment of this application, when it is indicated that reporting is performed in the foregoing first reporting manner, an SDT configuration or configured grant SDT (CG-SDT) may further be indicated.

The performing reporting in the foregoing first reporting manner includes:

performing reporting by using an MSG 1 (for example, a data volume is very small, and the MSG 1 is represented by a special preamble or represented by a special physical random access channel transmission opportunity RO resource); or initiating, by the UE, SDT, and performing reporting by using an MSG 3 or an MSG A (or a larger resource is scheduled by using an MSG 2, a plurality of PUSCH resources are scheduled, and reporting is performed by using a scheduled PUSCH resource); or after an RRC resume request is sent by using an MSG 3, starting, by a network side and/or a terminal, a time window (or a timer), where within the time window, the UE may receive a PUSCH scheduled by using a PDCCH, and perform reporting through the PUSCH, where a length of the time window, a size of the scheduled PUSCH resource (a quantity of RBs and a quantity of symbols), a quantity of PUSCHs, or the like is associated with the data volume of the sensing measurement result, and the data volume of the sensing measurement result may be a network function or a network element (for example, a sensing network function/sensing network element) of the core network and/or calculated by the base station based on a sensing requirement, or may be reported by the UE after completing sensing measurement.

The performing reporting in the foregoing second reporting manner includes:

initiating, by the UE, random access to enter a connected state, and performing reporting through a PUCCH or a PUSCH.

Optionally, when the UE initiates SDT or random access, an MSG 1 or an MSG A includes target indication information, and the target indication information is represented by using a special preamble or represented by using a special RO resource, to indicate that the SDT or a random access procedure is used to report the sensing measurement result.

Optionally, that the first terminal receives target indication information includes:

receiving the target indication information through at least one of the following, where the target indication information includes at least one of the first indication information, the second indication information, or the third indication information:

a first physical downlink control channel PDCCH;

a first physical downlink shared channel PDSCH scheduled by using the first PDCCH;

a system information block SIB message, for example, target indication information of some common sensing signals is indicated by using an SIB;

a radio resource control RRC release message, for example, a quantity of information carried by a PDCCH is limited, may be configured in the RRC release message, and is activated through the PDCCH (a paging PDCCH field has a limited size, several sensing signal configuration types are agreed in advance, different sensing signal configuration types and corresponding specific configurations are delivered through RRC release, and the PDCCH uses fewer bits to indicate the sensing signal configuration type);

a message in a random access process, where the message includes but is not limited to an Msg 2, an Msg 4, and an Msg B;

a PDCCH scrambled by using a cell radio network temporary identifier (Cell RNTI, C-RNTI); or a PDSCH scheduled by using the PDCCH scrambled by using the C-RNTI.

A target indication information update indication may be carried on the PDCCH scrambled by using the C-RNTI, and the target indication information is carried on the PDSCH scheduled by using the PDCCH.

It should be noted that in this embodiment of this application, the first indication information, the second indication information, and the third indication information may be sent by using a same message or by using different messages.

Optionally, that the first terminal receives the target indication information through a first PDCCH includes:

receiving, by the first terminal, the target indication information based on a bit of a short message on the first PDCCH;

receiving, by the first terminal, the target indication information based on a reserved bit on the first PDCCH; or receiving, by the first terminal, at least one first target PDCCH based on target PDCCH information indicated by the first PDCCH, where the first target PDCCH carries the target indication information.

Optionally, the target PDCCH information includes at least one of the following:

a control resource set index of the first target PDCCH;

a search space index of the first target PDCCH;

a monitoring moment of the first target PDCCH; or a frequency domain resource of the first target PDCCH, such as BWP information or carrier information.

Optionally, a time gap between the first target PDCCH and the first PDCCH is defined in a protocol or configured on a network.

The first target PDCCH reuses a control resource set (CORESET) or search space of the first PDCCH, or reuses a dedicated CORESET or dedicated SS of the first PDCCH. Optionally, a time gap between the first PDCCH and the first target PDCCH is agreed upon in a protocol or configured on a network, for example, 2 ms.

Optionally, the first PDCCH is determined based on an indication of a second PDCCH.

In this embodiment of this application, the first terminal may be indicated by the second PDCCH to receive at least one first PDCCH, and the PDSCH scheduled by using the first PDCCH carries the foregoing target indication information. In this manner, rough or stable information can be scheduled by using first-level DCI (DCI on the second PDCCH). A monitoring period of the first-level DCI may be set longer, and more detailed information is scheduled based on second-level DCI (DCI on the first PDCCH), thereby effectively reducing overheads of the PDCCH.

Optionally, the DCI on the first PDCCH is DCI 1_0 scrambled by using a paging RNTI (P-RNTI).

Optionally, that the first terminal receives the target indication information through a first PDSCH scheduled by using the first PDCCH includes:

obtaining first information indicated by the first PDCCH, where the first information is used to indicate carrying information of the first PDSCH; and when it is determined based on the first information that the target indication information is carried on the first PDSCH, receiving the target indication information based on the first PDSCH.

Optionally, the carrying information includes at least one of the following:

the target indication information; or a paging message.

Optionally, the obtaining first information indicated by the first PDCCH includes:

obtaining the first information based on a bit of a short message on the first PDCCH;

obtaining the first information based on a reserved bit on the first PDCCH; or obtaining the first information based on a first RNTI, where the first RNTI is an RNTI that is used to scramble the first PDCCH, and the first RNTI is associated with a sensing service, or the first RNTI is associated with a sensing service and paging.

In this embodiment of this application, if the UE does not support a sensing capability and receives paging DCI, and the DCI is sensing-associated DCI, the UE does not receive the PDSCH scheduled by using the DCI.

Optionally, the terminal identifier list associated with sensing may reuse a UE ID list on the PDSCH that is scheduled by using the DCI 1_0 scrambled by using the P-RNTI.

Optionally, it is indicated, after the UE ID list of the PDSCH, whether the UE ID is associated with sensing, paging, or both.

In the sensing method in this embodiment of this application, the first terminal in the idle state or the inactive state performs sensing measurement, to obtain the sensing measurement result, and reports the sensing measurement result, thereby implementing an objective of performing sensing by the terminal in the idle state or the inactive state.

Figure 3:
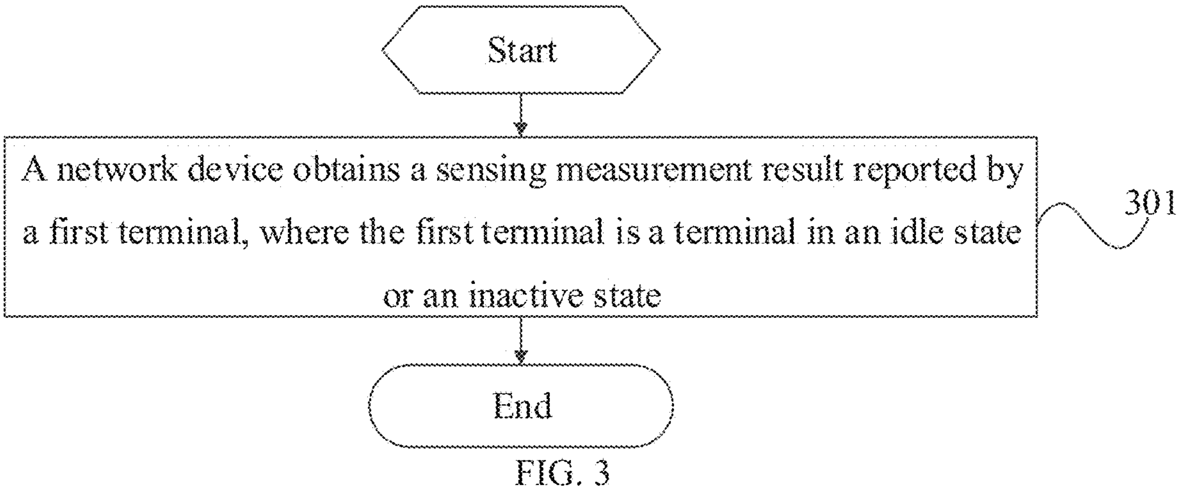
FIG. 3 is a schematic flowchart 2 of a sensing method according to an embodiment of this application.

As shown in FIG. 3, an embodiment of this application further provides a sensing method, including the following steps.

Step 301: A network device obtains a sensing measurement result reported by a first terminal, where the first terminal is a terminal in an idle state or an inactive state.

In the sensing method in this embodiment of this application, the network device obtains the foregoing sensing measurement result from the first terminal. The sensing measurement result is obtained after the terminal in the idle state or the inactive state performs sensing measurement, thereby implementing an objective of performing sensing by the terminal in the idle state or the inactive state.

Optionally, before the network device obtains the sensing measurement result reported by the first terminal, the method further includes:

sending first indication information, where the first indication information includes at least one of configuration information of a sensing signal or a sensing measurement quantity.

Optionally, before the network device obtains the sensing measurement result reported by the first terminal, the method further includes:

sending second indication information, where the second indication information includes a terminal identifier list associated with sensing.

Optionally, a terminal corresponding to the terminal identifier list is a terminal with a first sensing capability type, and the first sensing capability type is a sensing capability type corresponding to the sensing measurement.

Optionally, before the network device obtains the sensing measurement result reported by the first terminal, the method further includes:

sending third indication information, where the third indication information includes at least one of a reporting manner for the sensing measurement result, a reporting time of the sensing measurement result, and a quantity of times the sensing measurement result is reported.

Optionally, before the sending third indication information, the method further includes:

obtaining a data volume of the sensing measurement result; and determining the reporting manner for the sensing measurement result based on the data volume of the sensing measurement result.

The first indication information, the second indication information, and the third indication information are described in detail in the foregoing method embodiment on a terminal side, and details are not described herein again.

Optionally, the determining the reporting manner for the sensing measurement result based on the data volume of the sensing measurement result includes:

when the data volume of the sensing measurement result is less than or equal to a first preset threshold, determining that the reporting manner for the sensing measurement result is a first reporting manner; or when the data volume of the sensing measurement result is greater than a first preset threshold, determining that the reporting manner for the sensing measurement result is a second reporting manner, where the first reporting manner is a manner of performing reporting by initiating small data transmission; and the second reporting manner is a manner of performing reporting by initiating random access.

Optionally, the configuration information of the sensing signal includes at least one of the following:

a waveform of the sensing signal;

a subcarrier spacing of the sensing signal;

a guard interval of the sensing signal;

a bandwidth of the sensing signal;

burst duration of the sensing signal;

a time domain interval of the sensing signal;

a transmit signal power of the sensing signal;

a signal format of the sensing signal;

a signal direction of the sensing signal;

a time resource of the sensing signal;

a frequency resource of the sensing signal;

a quasi-co-location QCL relationship of the sensing signal; or antenna information of the sensing signal.

Optionally, the sensing measurement quantity includes at least one of the following:

original channel information;

signal strength information;

spectrum information;

multipath information;

angle information;

difference information of signals corresponding to different antennas; or target parameter information determined based on the original channel information.

The original channel information includes at least one of the following:

a channel matrix H; or channel state information (CSI), such as an amplitude/a square of an amplitude and/or a phase of a frequency domain channel response, or a feature of an I signal and a feature of a Q signal of a frequency domain channel response, such as an amplitude/a square of an amplitude of the I and Q signals.

The signal strength information includes at least one of the following:

a reference signal received power (RSRP); or a reference signal received information (RSRI).

The spectrum information includes at least one of the following:

a channel power delay profile (PDP);

a Doppler power spectrum; or a power azimuth spectrum (PAS).

The multipath information includes at least one of the following:

a power of each path (including at least a first-arrival path, an LOS path, a first-order reflection path, and a multi-order reflection path) on a multipath channel;

a delay of each path on a multipath channel; or an angle of each path on a multipath channel.

The difference information of signals corresponding to different antennas includes at least one of the following:

a quotient or conjugate product of frequency domain channel responses of a first antenna and a second antenna;

an amplitude ratio or an amplitude difference between signals received by a first antenna and a second antenna;

a phase difference between signals of a first antenna and a second antenna; or a delay difference between signals of a first antenna and a second antenna.

The target parameter information determined based on the original channel information includes at least one of the following:

Doppler spread;

a Doppler frequency shift;

a maximum delay spread;

an angle spread;

a coherent bandwidth; or a coherent time.

The angle information includes at least one of the following:

an angle of arrival; or an angle of departure.

The angle information includes UE side angle information, base station side angle information, and reflection point angle information.

In the sensing method in this embodiment of this application, the network device obtains the foregoing sensing measurement result from the first terminal. The sensing measurement result is obtained after the terminal in the idle state or the inactive state performs the sensing measurement, thereby implementing an objective of performing sensing by the terminal in the idle state or the inactive state.

It should be noted that the sensing method provided in this embodiment of this application may be executed by a sensing apparatus, or a control module that is in the sensing apparatus and that is configured to execute the sensing method. In an embodiment of this application, an example in which the sensing apparatus executes the sensing method is used to describe the sensing apparatus provided in this embodiment of this application.

Figure 4:
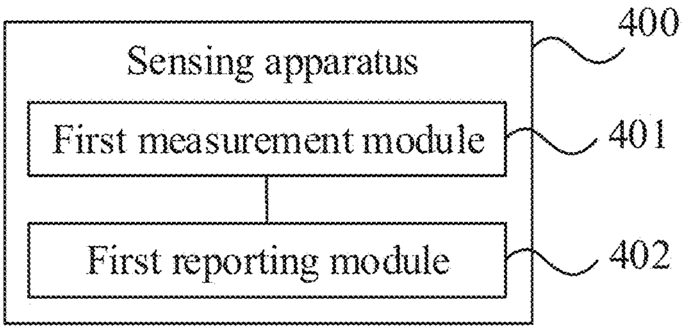
FIG. 4 is a schematic diagram 1 of modules of a sensing apparatus according to an embodiment of this application.

As shown in FIG. 4, an embodiment of this application further provides a sensing apparatus 400, including:

a first measurement module 401, configured to perform sensing measurement when a first terminal is in an idle state or an inactive state, to obtain a sensing measurement result; and a first reporting module 402, configured to report the sensing measurement result.

Optionally, the first measurement module includes:

a first receiving submodule, configured to receive first indication information, where the first indication information includes at least one of configuration information of a sensing signal or a sensing measurement quantity;

a second receiving submodule, configured to receive the sensing signal based on the configuration information of the sensing signal; and a first measurement submodule, configured to perform sensing measurement on the sensing signal based on the sensing measurement quantity, to obtain the sensing measurement result.

Optionally, the first measurement module includes:

a third receiving submodule, configured to receive second indication information, where the second indication information includes a terminal identifier list, and a terminal corresponding to the terminal identifier list is a terminal with a sensing capability; and a second measurement submodule, configured to: when the terminal identifier list includes a terminal identifier of the first terminal, perform sensing measurement.

Optionally, the terminal corresponding to the terminal identifier list is a terminal with a first sensing capability type, and the first sensing capability type is a sensing capability type corresponding to the sensing measurement.

Optionally, the first reporting module includes:

a fourth receiving submodule, configured to receive third indication information, where the third indication information includes at least one of a reporting manner for the sensing measurement result, a reporting time of the sensing measurement result, and a quantity of times the sensing measurement result is reported; and a reporting submodule, configured to report the sensing measurement result based on the third indication information.

Optionally, the apparatus in this embodiment of this application further includes:

a second reporting module, configured to report a data volume of the sensing measurement result, where the reporting manner for the sensing measurement result is related to the data volume of the sensing measurement result.

Optionally, when the data volume of the sensing measurement result is less than or equal to a first preset threshold, the reporting manner for the sensing measurement result is a first reporting manner; or when the data volume of the sensing measurement result is greater than a first preset threshold, the reporting manner for the sensing measurement result is a second reporting manner, where the first reporting manner is a manner of performing reporting by initiating small data transmission; and the second reporting manner is a manner of performing reporting by initiating random access.

Optionally, the receiving module is configured to receive target indication information by using at least one of the following, where the target indication information includes at least one of the first indication information, the second indication information, or the third indication information; and the receiving module includes at least one of the first receiving submodule, the third receiving submodule, or the fourth receiving submodule:

a first physical downlink control channel PDCCH;

a first physical downlink shared channel PDSCH scheduled by using the first PDCCH;

a system information block SIB message;

a radio resource control RRC release message;

a message in a random access process;

a PDCCH scrambled by using a cell radio network temporary identifier C-RNTI; or a PDSCH scheduled by using the PDCCH scrambled by using the C-RNTI.

Optionally, the receiving module is configured to: receive the target indication information based on a bit of a short message on the first PDCCH;

receive the target indication information based on a reserved bit on the first PDCCH; or receive at least one first target PDCCH based on target PDCCH information indicated by the first PDCCH, where the first target PDCCH carries the target indication information.

Optionally, the target PDCCH information includes at least one of the following:

a control resource set index of the first target PDCCH;

a search space index of the first target PDCCH;

a monitoring moment of the first target PDCCH; or a frequency domain resource of the first target PDCCH.

Optionally, a time gap between the first target PDCCH and the first PDCCH is defined in a protocol or configured on a network.

Optionally, the first PDCCH is determined based on an indication of a second PDCCH.

Optionally, the receiving module includes:

a first obtaining submodule, configured to obtain first information indicated by the first PDCCH, where the first information is used to indicate carrying information of the first PDSCH; and a fifth receiving submodule, configured to: when it is determined based on the first information that the target indication information is carried on the first PDSCH, receive the target indication information based on the first PDSCH.

Optionally, the carrying information includes at least one of the following:

the target indication information; or a paging message.

Optionally, the first obtaining submodule is configured to: obtain the first information based on a bit of a short message on the first PDCCH;

obtain the first information based on a reserved bit on the first PDCCH; or obtain the first information based on a first RNTI, where the first RNTI is an RNTI that is used to scramble the first PDCCH, and the first RNTI is associated with a sensing service, or the first RNTI is associated with a sensing service and paging.

Optionally, the configuration information of the sensing signal includes at least one of the following:

a waveform of the sensing signal;

a subcarrier spacing of the sensing signal;

a guard interval of the sensing signal;

a bandwidth of the sensing signal;

burst duration of the sensing signal;

a time domain interval of the sensing signal;

a transmit signal power of the sensing signal;

a signal format of the sensing signal;

a signal direction of the sensing signal;

a time resource of the sensing signal;

a frequency resource of the sensing signal;

a quasi-co-location QCL relationship of the sensing signal; or antenna information of the sensing signal.

Optionally, the sensing measurement quantity includes at least one of the following:

original channel information;

signal strength information;

spectrum information;

multipath information;

angle information;

difference information of signals corresponding to different antennas; or target parameter information determined based on the original channel information.

In this embodiment of this application, the first terminal in the idle state or the inactive state performs sensing measurement, to obtain the sensing measurement result, and reports the sensing measurement result, thereby implementing an objective of performing sensing by the terminal in the idle state or the inactive state.

The sensing apparatus in this embodiment of this application may be an apparatus, or an apparatus or electronic device with an operating system, or may be a component, an integrated circuit, or a chip in a terminal. The apparatus or the electronic device may be a mobile terminal, or a non-mobile terminal. For example, the mobile terminal may include but is not limited to the foregoing listed types of the terminal 11. The non-mobile terminal may be a server, a network attached storage (NAS), a personal computer (PC), a television (TV), a teller machine, a self-service machine, or the like. This is not specifically limited in this embodiment of this application.

The apparatus provided in this embodiment of this application can implement the processes implemented in the method embodiment in FIG. 2 and same technical effect is achieved. To avoid repetition, details are not described herein again.

Figure 5:
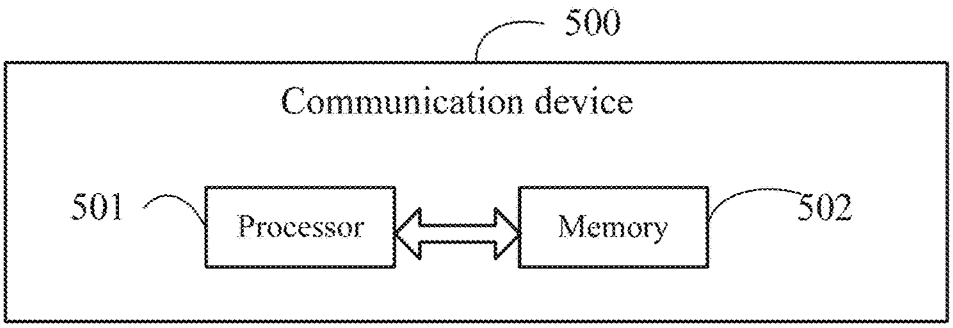
FIG. 5 is a structural block diagram of a communication device according to an embodiment of this application.

Optionally, as shown in FIG. 5, an embodiment of this application further provides a communication device 500, including a processor 501, a memory 502, a program or an instruction stored in the memory 502 and capable of running on the processor 501. For example, when the communication device 500 is a first terminal, the program or the instruction is executed by the processor 501 to implement the processes of the embodiment of the foregoing sensing method applied to the first terminal, and same technical effect can be achieved. When the communications device 500 is a network device, the program or the instruction is executed by the processor 501 to implement the processes of the embodiment of the foregoing sensing method applied to the network device, and same technical effect can be achieved. To avoid repetition, details are not described herein again.

An embodiment of this application further provides a terminal, including a processor and a communication interface. The processor is configured to perform sensing measurement when a first terminal is in an idle state or an inactive state, to obtain a sensing measurement result. The communication interface is configured to report the sensing measurement result.

Figure 6:
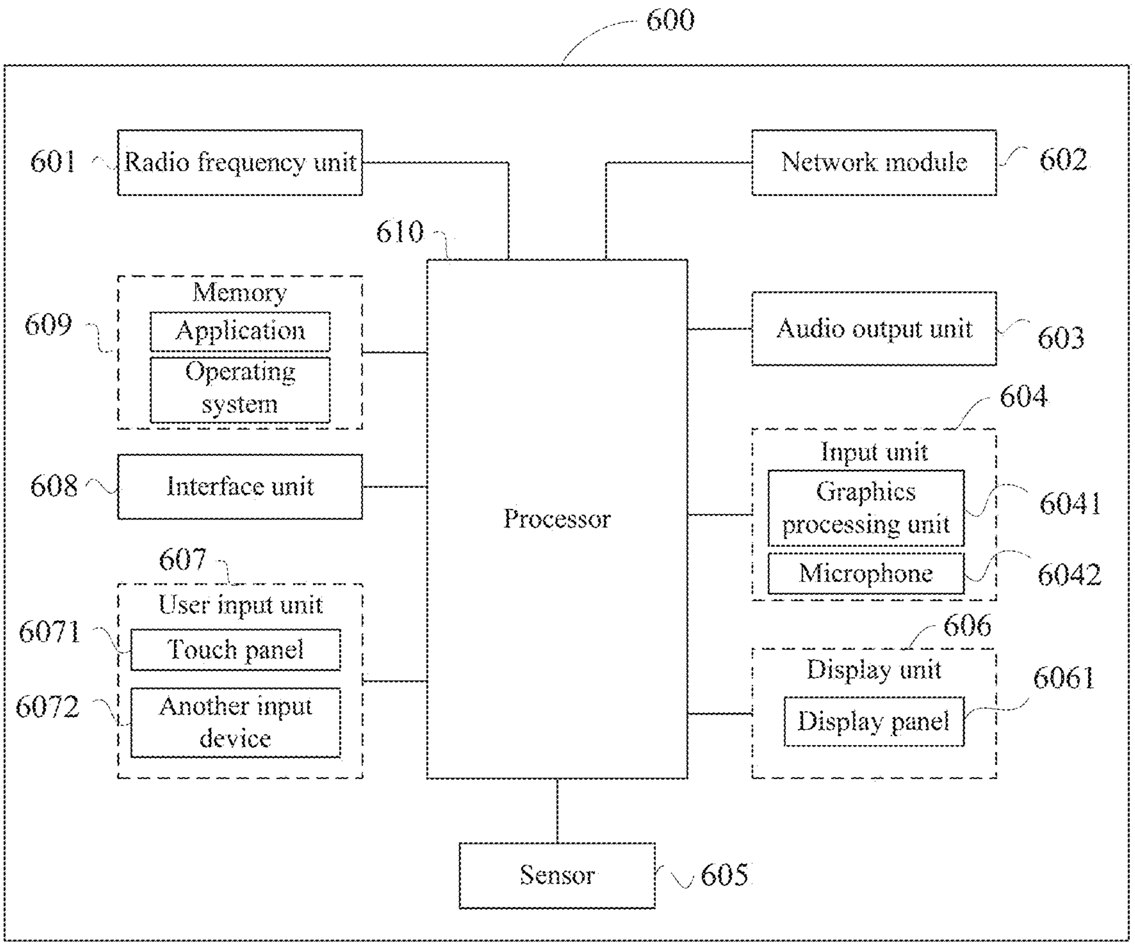
FIG. 6 is a structural block diagram of a terminal according to an embodiment of this application.

This terminal embodiment corresponds to the foregoing method embodiment on the terminal side. Each implementation process and implementation of the foregoing method embodiment may be applicable to this terminal embodiment, and same technical effect can be achieved. Specifically, FIG. 6 is a schematic diagram of a hardware structure of a terminal according to an embodiment of this application. The terminal 600 includes but is not limited to at least some components in the following: a radio frequency unit 601, a network module 602, an audio output unit 603, an input unit 604, a sensor 605, a display unit 606, a user input unit 607, an interface unit 608, a memory 609, a processor 610, and the like.

A person skilled in the art may understand that the terminal 600 may further include a power supply (such as a battery) that supplies power to each component. The power supply may be logically connected to the processor 610 by using a power supply management system, to implement functions such as charging and discharging management, and power consumption management by using the power supply management system. The terminal structure shown in FIG. 6 constitutes no limitation on the terminal, and the terminal may include more or fewer components than those shown in the figure, or combine some components, or have different component arrangements. Details are not described herein.

It should be understood that in this embodiment of this application, the input unit 604 may include a graphics processing unit (GPU) 6041 and a microphone 6042. The graphics processing unit 6041 processes image data of a static picture or a video obtained by an image capture apparatus (for example, a camera) in a video capture mode or an image capture mode. The display unit 606 may include a display panel 6061. Optionally, the display panel 6061 may be configured in a form such as a liquid crystal display or an organic light-emitting diode. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein.

In this embodiment of this application, the radio frequency unit 601 receives downlink data from a network side device and then sends the downlink data to the processor 610 for processing; and sends uplink data to the network side device. Usually, the radio frequency unit 601 includes but is not limited to an antenna, at least one amplifier, a transceiver, a coupler, a low noise amplifier, a duplexer, and the like.

The memory 609 may be configured to store a software program or an instruction and various data. The memory 609 may mainly include a program or instruction storage area and a data storage area. The program or instruction storage area may store an operating system, an application or an instruction required by at least one function (for example, a sound playing function or an image playing function), and the like. In addition, the memory 609 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 610 may include one or more processing units. Optionally, an application processor and a modem processor may be integrated into the processor 610. The application processor mainly processes an operating system, a user interface, an application, an instruction, or the like. The modem processor mainly processes wireless communication, for example, a baseband processor. It may be understood that, the modem processor may alternatively not be integrated into the processor 610.

The processor 610 is configured to perform sensing measurement to obtain the sensing measurement result. The radio frequency unit 601 is configured to report the sensing measurement result.

The processor 610 is further configured to: receive first indication information, where the first indication information includes at least one of configuration information of a sensing signal or a sensing measurement quantity;

receive the sensing signal based on the configuration information of the sensing signal; and perform sensing measurement on the sensing signal based on the sensing measurement quantity, to obtain the sensing measurement result.

The processor 610 is further configured to:

- receive second indication information, where the second indication information includes a terminal identifier list, and a terminal corresponding to the terminal identifier list is a terminal with a sensing capability; and
- when the terminal identifier list includes a terminal identifier of a first terminal, perform sensing measurement.

Optionally, the terminal corresponding to the terminal identifier list is a terminal with a first sensing capability type, and the first sensing capability type is a sensing capability type corresponding to the sensing measurement.

Optionally, the radio frequency unit 601 is configured to: receive third indication information, where the third indication information includes at least one of a reporting manner for the sensing measurement result, a reporting time of the sensing measurement result, and a quantity of times the sensing measurement result is reported; and report the sensing measurement result based on the third indication information.

Optionally, the radio frequency unit 601 is further configured to:

- report a data volume of the sensing measurement result, where the reporting manner for the sensing measurement result is related to the data volume of the sensing measurement result.

Optionally, when the data volume of the sensing measurement result is less than or equal to a first preset threshold, the reporting manner for the sensing measurement result is a first reporting manner; or when the data volume of the sensing measurement result is greater than a first preset threshold, the reporting manner for the sensing measurement result is a second reporting manner, where the first reporting manner is a manner of performing reporting by initiating small data transmission; and the second reporting manner is a manner of performing reporting by initiating random access.

Optionally, the radio frequency unit 601 is configured to receive target indication information through at least one of the following, where the target indication information includes at least one of the first indication information, the second indication information, or the third indication information:

a first physical downlink control channel PDCCH;

a first physical downlink shared channel PDSCH scheduled by using the first PDCCH;

a system information block SIB message;

a radio resource control RRC release message;

a message in a random access process;

a PDCCH scrambled by using a cell radio network temporary identifier C-RNTI; or a PDSCH scheduled by using the PDCCH scrambled by using the C-RNTI.

Optionally, the radio frequency unit 601 is configured to: receive the target indication information based on a bit of a short message on the first PDCCH;

receive the target indication information based on a reserved bit on the first PDCCH; or receive at least one first target PDCCH based on target PDCCH information indicated by the first PDCCH, where the first target PDCCH carries the target indication information.

Optionally, the target PDCCH information includes at least one of the following:

a control resource set index of the first target PDCCH;

a search space index of the first target PDCCH;

a monitoring moment of the first target PDCCH; or a frequency domain resource of the first target PDCCH.

Optionally, a time gap between the first target PDCCH and the first PDCCH is defined in a protocol or configured on a network.

Optionally, the first PDCCH is determined based on an indication of a second PDCCH.

Optionally, the radio frequency unit 601 is configured to: obtain first information indicated by the first PDCCH, where the first information is used to indicate carrying information of the first PDSCH. The processor 610 is configured to: when it is determined based on the first information that the target indication information is carried on the first PDSCH, receive the target indication information based on the first PDSCH.

Optionally, the carrying information includes at least one of the following:

the target indication information; or a paging message.

Optionally, the radio frequency unit 601 is configured to: obtain the first information based on a bit of a short message on the first PDCCH;

obtain the first information based on a reserved bit on the first PDCCH; or obtaining the first information based on a first RNTI, where the first RNTI is an RNTI that is used to scramble the first PDCCH, and the first RNTI is associated with a sensing service, or the first RNTI is associated with a sensing service and paging.

Optionally, the configuration information of the sensing signal includes at least one of the following:

a waveform of the sensing signal;

a subcarrier spacing of the sensing signal;

a guard interval of the sensing signal;

a bandwidth of the sensing signal;

burst duration of the sensing signal;

a time domain interval of the sensing signal;

a transmit signal power of the sensing signal;

a signal format of the sensing signal;

a signal direction of the sensing signal;

a time resource of the sensing signal;

a frequency resource of the sensing signal; and a quasi-co-location QCL relationship of the sensing signal; or antenna information of the sensing signal.

Optionally, the sensing measurement quantity includes at least one of the following:

original channel information;

signal strength information;

spectrum information;

multipath information;

angle information;

difference information of signals corresponding to different antennas; or target parameter information determined based on the original channel information.

In this embodiment of this application, the terminal in the idle state or the inactive state performs sensing measurement, to obtain the sensing measurement result, and reports the sensing measurement result, thereby implementing an objective of performing sensing by the terminal in the idle state or the inactive state.

Figure 7:
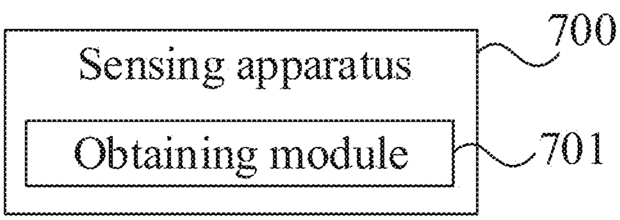
FIG. 7 is a schematic diagram 2 of modules of a sensing apparatus according to an embodiment of this application.

As shown in FIG. 7, an embodiment of this application provides a sensing apparatus 700, including:

an obtaining module 701, configured to obtain a sensing measurement result reported by a first terminal, where the first terminal is a terminal in an idle state or an inactive state.

Optionally, the apparatus in this embodiment of this application further includes:

a first sending module, configured to send first indication information before the obtaining module obtains the sensing measurement result reported by the first terminal, where the first indication information includes at least one of configuration information of a sensing signal or a sensing measurement quantity, and the sensing measurement result is obtained based on the configuration information of the sensing signal and the sensing measurement quantity.

Optionally, the apparatus in this embodiment of this application further includes:

a second sending module, configured to send second indication information before the obtaining module obtains the sensing measurement result reported by the first terminal, where the second indication information includes a terminal identifier list associated with sensing.

Optionally, a terminal corresponding to the terminal identifier list is a terminal with a first sensing capability type, and the first sensing capability type is a sensing capability type corresponding to the sensing measurement.

Optionally, the apparatus in this embodiment of this application further includes:

a third sending module, configured to send third indication information before the obtaining module obtains the sensing measurement result reported by the first terminal, where the third indication information includes at least one of a reporting manner for the sensing measurement result, a reporting time of the sensing measurement result, and a quantity of times the sensing measurement result is reported.

Optionally, the apparatus in this embodiment of this application further includes:

a second obtaining submodule, configured to obtain a data volume of the sensing measurement result before the third sending module sends the third indication information; and a determining submodule, configured to determine the reporting manner for the sensing measurement result based on the data volume of the sensing measurement result.

Optionally, the determining submodule is configured to:

when the data volume of the sensing measurement result is less than or equal to a first preset threshold, determine that the reporting manner for the sensing measurement result is a first reporting manner; or when the data volume of the sensing measurement result is greater than a first preset threshold, determine that the reporting manner for the sensing measurement result is a second reporting manner, where the first reporting manner is a manner of performing reporting by initiating small data transmission; and the second reporting manner is a manner of performing reporting by initiating random access.

Optionally, the configuration information of the sensing signal includes at least one of the following:

a waveform of the sensing signal;

a subcarrier spacing of the sensing signal;

a guard interval of the sensing signal;

a bandwidth of the sensing signal;

burst duration of the sensing signal;

a time domain interval of the sensing signal;

a transmit signal power of the sensing signal;

a signal format of the sensing signal;

a signal direction of the sensing signal;

a time resource of the sensing signal;

a frequency resource of the sensing signal; and a quasi-co-location QCL relationship of the sensing signal; or antenna information of the sensing signal.

Optionally, the sensing measurement quantity includes at least one of the following:

original channel information;

signal strength information;

spectrum information;

multipath information;

angle information;

difference information of signals corresponding to different antennas; or target parameter information determined based on the original channel information.

In this embodiment of this application, a network device obtains the foregoing sensing measurement result from the first terminal, where the sensing measurement result is obtained after the terminal in the idle state or the inactive state performs sensing measurement, thereby implementing an objective of performing sensing by the terminal in the idle state or the inactive state.

Alternatively, an embodiment of this application further provides a network device, including a processor and a communication interface. The communication interface is configured to obtain a sensing measurement result reported by a first terminal, where the first terminal is a terminal in an idle state or an inactive state. The network device embodiment corresponds to the foregoing method embodiment of the network device. Each implementation process and implementation of the foregoing method embodiment may be applicable to the network device embodiment, and same technical effect can be achieved.

Figure 8:
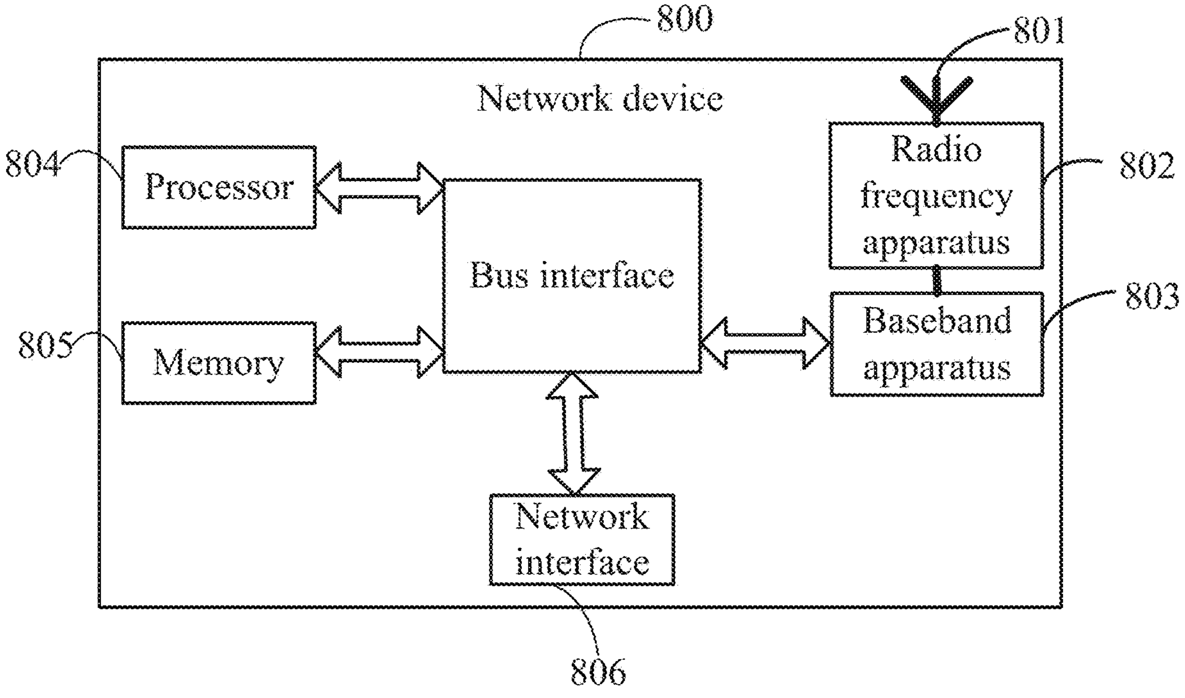
FIG. 8 is a structural block diagram of a network device according to an embodiment of this application.

Specifically, an embodiment of this application further provides a network device. As shown in FIG. 8, the network device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes information that needs to be sent, and sends processed information to the radio frequency apparatus 802. The radio frequency apparatus 802 processes the received information, and sends processed information by using the antenna 801.

A band processing apparatus may be located in the baseband apparatus 803. In the foregoing embodiment, the method performed by the network device may be implemented in the baseband apparatus 803. The baseband apparatus 803 includes a processor 804 and a memory 805.

The baseband apparatus 803 may include, for example, at least one baseband board, where a plurality of chips are disposed on the baseband board. As shown in FIG. 8, one chip is, for example, the processor 804, which is connected to the memory 805, to invoke a program in the memory 805 to perform operations of the network device shown in the foregoing method embodiment.

The baseband apparatus 803 may further include a network interface 806, configured to exchange information with the radio frequency apparatus 802. For example, the interface is a common public radio interface (CPRI for short).

Specifically, the network device in this embodiment of the present invention further includes an instruction or a program stored in the memory 805 and capable of running on the processor 804. The processor 804 invokes the instruction or the program in the memory 805 to perform the method performed by the modules shown in FIG. 7, with the same technical effect achieved. To avoid repetition, details are not described herein again.

An embodiment of this application further provides a readable storage medium. The readable storage medium stores a program or an instruction. When the program or the instruction is executed by a processor, the processes of the foregoing embodiments of the sensing method are implemented, and same technical effect can be achieved. To avoid repetition, details are not described herein again.

The processor is a processor in the terminal in the foregoing embodiments. The readable storage medium includes a computer readable storage medium, such as a read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing embodiments of the sensing method, and same technical effect can be achieved. To avoid repetition, details are not described herein again.

It should be understood that the chip mentioned in this embodiment of this application may alternatively be referred to as a system-level chip, a system chip, a chip system, a system on chip, or the like.

An embodiment of this application further provides a computer program/program product. The computer program/program product is stored in a non-transient storage medium, and the computer program/program product is executed by at least one processor to implement the processes of the foregoing sensing method embodiment, and same technical effect can be achieved. To avoid repetition, details are not described herein again.

It should be noted that, in this specification, the term “include”, “comprise”, or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. In absence of more constraints, an element preceded by “includes a . . . ” does not preclude the existence of other identical elements in the process, method, article, or apparatus that includes the element. In addition, it should be noted that the scope of the method and the apparatus in the implementations of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the foregoing specific implementations, and the foregoing specific implementations are only illustrative and not restrictive. Under the enlightenment of this application, a person of ordinary skill in the art can make many forms without departing from the purpose of this application and the protection scope of the claims, all of which fall within the protection of this application.

What is claimed is:

1. A sensing method, comprising:

performing, by a first terminal, sensing measurement to obtain a sensing measurement result, wherein the first terminal is a terminal in an idle state or an inactive state; and reporting, by the first terminal, the sensing measurement result, wherein when a data volume of the sensing measurement result is less than or equal to a first preset threshold, a reporting manner for the sensing measurement result is a first reporting manner; or when the data volume of the sensing measurement result is greater than the first preset threshold, the reporting manner for the sensing measurement result is a second reporting manner, wherein the first reporting manner is a manner of performing reporting by initiating small data transmission (SDT); and the second reporting manner is a manner of performing reporting by initiating random access.

2. The method according to claim 1, wherein the performing, by a first terminal, sensing measurement to obtain a sensing measurement result comprises:

receiving, by the first terminal, first indication information, wherein the first indication information comprises at least one of configuration information of a sensing signal or a sensing measurement quantity;

receiving, by the first terminal, the sensing signal based on the configuration information of the sensing signal; and performing, by the first terminal, sensing measurement on the sensing signal based on the sensing measurement quantity, to obtain the sensing measurement result; or, wherein the performing, by a first terminal, sensing measurement comprises:

receiving, by the first terminal, second indication information, wherein the second indication information comprises a terminal identifier list, and a terminal corresponding to the terminal identifier list is a terminal with a sensing measurement capability; and when the terminal identifier list comprises a terminal identifier of the first terminal, performing, by the first terminal, sensing measurement;

or, wherein the reporting, by the first terminal, the sensing measurement result comprises:

receiving, by the first terminal, third indication information, wherein the third indication information comprises at least one of the reporting manner for the sensing measurement result, a reporting time of the sensing measurement result, and a quantity of times the sensing measurement result is reported; and reporting, by the first terminal, the sensing measurement result based on the third indication information.

3. The method according to claim 2, wherein the terminal corresponding to the terminal identifier list which is the terminal with the sensing measurement capability, comprises a terminal corresponding to the terminal identifier list and has a first sensing capability type, and the first sensing capability type is a sensing capability type corresponding to the sensing measurement.

4. The method according to claim 2, further comprising:

reporting the data volume of the sensing measurement result, wherein the reporting manner for the sensing measurement result is related to the data volume of the sensing measurement result.

5. The method according to claim 2, wherein the first terminal receives target indication information through at least one of the following, wherein the target indication information comprises at least one of the first indication information, the second indication information, or the third indication information:

a first physical downlink control channel PDCCH;

a first physical downlink shared channel PDSCH scheduled by using the first PDCCH;

a system information block SIB message;

a radio resource control RRC release message;

a message in a random access process;

a PDCCH scrambled by using a cell radio network temporary identifier C-RNTI; or a PDSCH scheduled by using the PDCCH scrambled by using the C-RNTI.

6. The method according to claim 5, wherein the receiving, by the first terminal, the target indication information through the first PDCCH comprises:

receiving, by the first terminal, the target indication information based on a bit of a short message on the first PDCCH;

receiving, by the first terminal, the target indication information based on a reserved bit on the first PDCCH; or receiving, by the first terminal, at least one first target PDCCH based on target PDCCH information indicated by the first PDCCH, wherein the first target PDCCH carries the target indication information.

7. The method according to claim 6, wherein the target PDCCH information comprises at least one of the following:

a control resource set index of the first target PDCCH;

a search space index of the first target PDCCH;

a monitoring moment of the first target PDCCH; or a frequency domain resource of the first target PDCCH.

8. The method according to claim 6, wherein a time gap between the first target PDCCH and the first PDCCH is defined in a protocol or configured on a network.

9. The method according to claim 5, wherein the first PDCCH is determined based on an indication of a second PDCCH.

10. The method according to claim 5, wherein the receiving, by the first terminal, target indication information through a first PDSCH scheduled by using the first PDCCH comprises:

obtaining first information indicated by the first PDCCH, wherein the first information is used to indicate carrying information of the first PDSCH; and when it is determined based on the first information that the target indication information is carried on the first PDSCH, receiving the target indication information based on the first PDSCH.

11. The method according to claim 10, wherein the carrying information comprises at least one of the following:

the target indication information; or a paging message.

12. The method according to claim 10, wherein the obtaining first information indicated by the first PDCCH comprises:

obtaining the first information based on a bit of a short message on the first PDCCH;

obtaining the first information based on a reserved bit on the first PDCCH; or obtaining the first information based on a first RNTI, wherein the first RNTI is an RNTI that is used to scramble the first PDCCH, and the first RNTI is associated with a sensing service, or the first RNTI is associated with a sensing service and paging.

13. The method according to claim 2, wherein the configuration information of the sensing signal comprises at least one of the following:

a waveform of the sensing signal;

a subcarrier spacing of the sensing signal;

a guard interval of the sensing signal;

a bandwidth of the sensing signal;

burst duration of the sensing signal;

a time domain interval of the sensing signal;

a transmit signal power of the sensing signal;

a signal format of the sensing signal;

a signal direction of the sensing signal;

a time resource of the sensing signal;

a frequency resource of the sensing signal;

a quasi-co-location QCL relationship of the sensing signal; or antenna information of the sensing signal;

or, wherein the sensing measurement quantity comprises at least one of the following:

original channel information;

signal strength information;

spectrum information;

multipath information;

angle information;

difference information of signals corresponding to different antennas; or target parameter information determined based on the original channel information.

14. A sensing method, comprising:

obtaining, by a network device, a sensing measurement result reported by a first terminal, wherein the first terminal is a terminal in an idle state or an inactive state, wherein the method further comprises determining a reporting manner for the sensing measurement result based on a data volume of the sensing measurement result, wherein the determining the reporting manner for the sensing measurement result based on the data volume of the sensing measurement result comprises:

when the data volume of the sensing measurement result is less than or equal to a first preset threshold, determining that the reporting manner for the sensing measurement result is a first reporting manner; or when the data volume of the sensing measurement result is greater than a first preset threshold, determining that the reporting manner for the sensing measurement result is a second reporting manner, wherein the first reporting manner is a manner of performing reporting by initiating small data transmission (SDT); and the second reporting manner is a manner of performing reporting by initiating random access.

15. The method according to claim 14, before the obtaining, by a network device, a sensing measurement result reported by a first terminal, further comprising:

sending first indication information, wherein the first indication information comprises at least one of configuration information of a sensing signal or a sensing measurement quantity, and the sensing measurement result is obtained based on the configuration information of the sensing signal and the sensing measurement quantity;

or, sending second indication information, wherein the second indication information comprises a terminal identifier list associated with sensing;

or, sending third indication information, wherein the third indication information comprises at least one of the reporting manner for the sensing measurement result, a reporting time of the sensing measurement result, and a quantity of times the sensing measurement result is reported.

16. The method according to claim 15, before the sending third indication information, further comprising:

obtaining the data volume of the sensing measurement result.

17. A sensing apparatus, applied to a first terminal, comprising: a processor, a memory, and a program or an instruction stored in the memory and capable of running on the processor, wherein the program or the instruction, when executed by the processor, causes the processor to perform:

performing sensing measurement when the first terminal is in an idle state or an inactive state, to obtain a sensing measurement result; and reporting the sensing measurement result, wherein when a data volume of the sensing measurement result is less than or equal to a first preset threshold, a reporting manner for the sensing measurement result is a first reporting manner; or when the data volume of the sensing measurement result is greater than the first preset threshold, the reporting manner for the sensing measurement result is a second reporting manner, wherein the first reporting manner is a manner of performing reporting by initiating small data transmission (SDT); and the second reporting manner is a manner of performing reporting by initiating random access.

18. A communication device, comprising: a processor, a memory, and a program or an instruction stored in the memory and capable of running on the processor, wherein the program or the instruction, when executed by the processor, causes the processor to perform the method according to claim 14.

* * * * *